(12) United States Patent
Kersting et al.

(10) Patent No.: US 8,585,266 B2
(45) Date of Patent: Nov. 19, 2013

(54) DEVICE FOR THE ADJUSTABLE FIXING OF A HEADLAMP

(75) Inventors: Dirk Kersting, Lippstadt (DE); Andre Schmidt, Hamm (DE)

(73) Assignee: HPBO GmbH, Lippstadt (DE)

( * ) Notice: Subject to any disclaimer, the term of this patent is extended or adjusted under 35 U.S.C. 154(b) by 641 days.

(21) Appl. No.: 11/989,742

(22) PCT Filed: Jun. 22, 2006

(86) PCT No.: PCT/DE2006/001064
§ 371 (c)(1),
(2), (4) Date: Mar. 26, 2009

(87) PCT Pub. No.: WO2007/016888
PCT Pub. Date: Feb. 15, 2007

(65) Prior Publication Data
US 2009/0213609 A1     Aug. 27, 2009

(30) Foreign Application Priority Data
Aug. 8, 2005 (DE) .......................... 10 2005 037 816

(51) Int. Cl.
*F21V 19/02* (2006.01)
*F21V 21/14* (2006.01)

(52) U.S. Cl.
USPC ............................ 362/523; 362/419; 362/507

(58) Field of Classification Search
USPC .................................. 362/418–419, 507, 523
See application file for complete search history.

(56) References Cited

U.S. PATENT DOCUMENTS

| | | | |
|---|---|---|---|
| 2,846,250 A | 8/1958 | Davis | |
| 5,230,130 A | 7/1993 | Bishop | |
| 6,199,817 B1 | 3/2001 | Schmickl et al. | |

FOREIGN PATENT DOCUMENTS

| | | |
|---|---|---|
| DE | 3540724 C1 | 12/1986 |
| DE | 4017701 A1 | 12/1991 |
| DE | 196 36 029 C1 | 2/1998 |
| DE | 29810988 U1 | 12/1999 |
| DE | 199 49 467 A1 | 3/2001 |
| DE | 100 48 279 A1 | 4/2002 |
| EP | 0978416 B1 | 2/2000 |
| EP | 1502841 A1 | 2/2005 |
| EP | 1504954 A2 | 2/2005 |
| EP | 1544035 A1 | 6/2005 |
| FR | 2594761 A1 | 8/1987 |
| FR | 2 727 479 A | 5/1996 |
| JP | 4-113943 A | 4/1992 |

*Primary Examiner* — Jason Moon Han
(74) *Attorney, Agent, or Firm* — Birch, Stewart, Kolasch & Birch, LLP

(57) ABSTRACT

A device for the adjustable fixing of a headlamp with a housing in a body opening of a motor vehicle, with at least one lower fixing point arranged in a lower region, in the vertical direction, of the housing and with at least one upper fixing point arranged in an upper region, in the vertical direction, of the housing, wherein a tab of the housing is connected to a support part at the upper or lower fixing point via a holder which runs transversely to the beam direction of the headlamp and can be displaced along a first adjustment direction (Y), wherein the holder is mounted such that it can be displaced with respect to the support part in the first adjustment direction (Y) via a guide, and wherein the holder is assigned a blocking device for fixing the holder in the first adjustment direction (Y).

8 Claims, 2 Drawing Sheets

DEVICE FOR THE ADJUSTABLE FIXING OF A HEADLAMP

Figure 1:
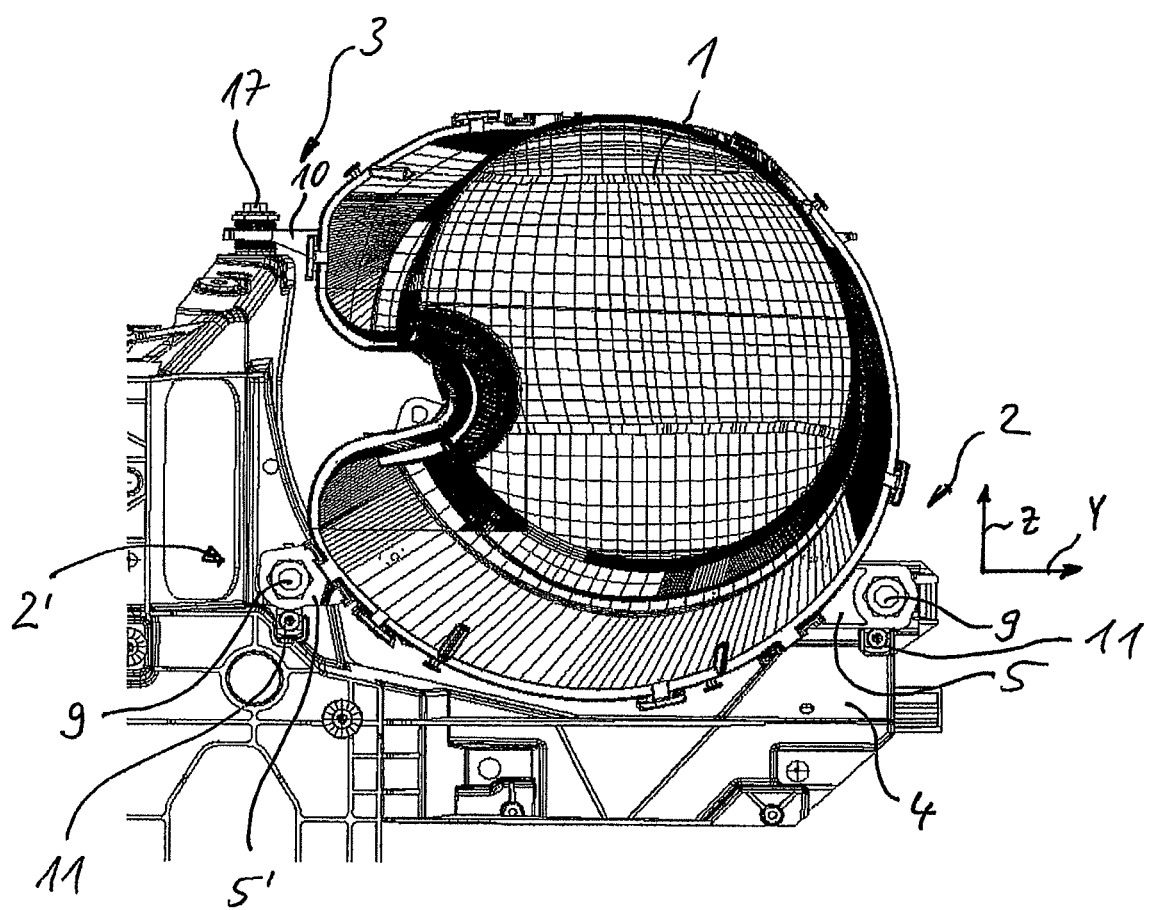

The invention relates to a device for the adjustable fixing of a headlamp comprising a housing in a body opening of a motor vehicle, having at least one lower fixing point, which, in a vertical direction, is arranged in a lower region of the housing, and having at least one upper fixing point which, in a vertical direction, is arranged in an upper region of the housing, wherein at the upper or lower fixing point, a connecting piece of the housing is connected to a support part via a slidable holder, which runs transversely to the radiation direction of the headlamp and along a first adjustment direction.

From EP 0 978 416 A2, a device is known for adjustably fixing of a headlight having a housing in a body opening of a motor vehicle, which at an upper or lower fixing point in the region of the housing is provided with a holder, which is slidable transversely to the radiation direction of the headlight. The holder is thereby inserted in a longitudinal slot of a connecting piece of the headlight housing and, after rotating it by 90 degrees, allows a relative displacement of the headlight housing to a support part of the motor vehicle along an adjustment direction, which extends transversely to the radiation direction. However, this known device, which proved to be successful in commercial application, has the disadvantage that essentially, the headlamp housing is fixed to the support part at at least one other fixing point, where the adjustment of the headlamp housing in a different direction also takes place. The need of the headlamp housing having to be adjusted in two directions extending vertical to one another requires a relatively large amount of effort when adjusting the headlamp housing according to a specified groove course in the surrounding body parts.

It is therefore the object of the present invention to improve a device for adjustably fixing of a headlamp such that the adjustment of the headlamp housing, in particular the adjustment within a specified groove course in the surrounding body parts, is simplified.

To meet this objective, the invention, together with the preamble of patent claim 1, is characterized in that the first adjustment direction, the holder is positioned slidably to the support part via a guide, and that the holder has a designated blocking device for fixing the holder into place in the first adjustment direction.

The particular advantage of the invention is that an adjustment of the headlight housing by the holder is only possible in one preset adjustment direction without the need of a simultaneous adjustment of the headlamp housing in a direction other than the adjustment direction. The basic idea of the invention is to provide adjustment means such that the headlamp housing can only be adjusted either in a first adjustment direction or in a second adjustment direction, which extends vertically to the first adjustment direction. In this way, a separate adjustment of the headlamp housing in a first adjustment direction can be done independent from the second adjustment direction. Thus, the adjustment of the headlamp housing within a specified groove course of a body opening is substantially simplified.

By locking and unlocking, the blocking device of the present invention allows a simple adjustment of the holder along the first adjustment direction. By locking the blocking device, the headlamp housing is fixed into place in the first adjustment direction.

According to a preferred embodiment of the invention, the holder is provided with guide means so that a connecting piece of the housing is arranged slidably to the holder in an adjustment direction, which extends vertically to a further adjustment direction, along which the holder is slidable relative to the body part. Beneficially, this allows the decoupling of the adjustment at a fixing point. The headlamp housing, together with the holder, can be adjusted along a first adjustment direction and relative to the holder along a second adjustment direction, which extends vertically to the first adjustment direction.

In a further embodiment of the invention, the blocking device comprises a fixing element as well as a fixing plate, which applies pressure to the holder. Beneficially, this allows the blocking device to be arranged in one place, whereas the holder is slidably positioned along the adjustment direction.

Further benefits of the invention are described in the dependent claims.

Figure 2:
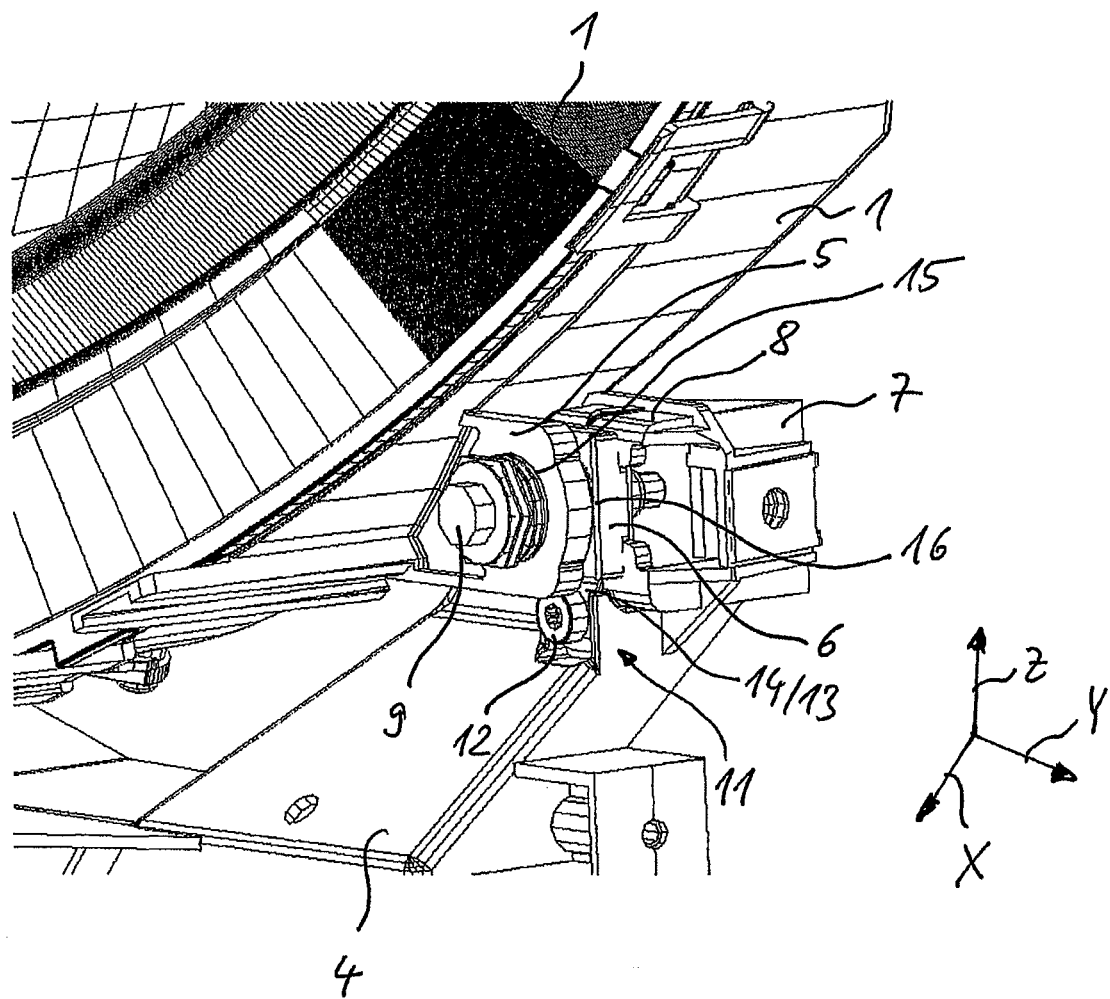

Therebelow, one exemplary embodiment of the invention is described in more detail with reference to the drawings, wherein FIG. 1 shows a schematic front view of a headlamp housing mounted to a support part of a motor vehicle; and FIG. 2 is a perspective illustration of a fixing point of the headlamp housing to the support part.

A device for the adjustable fixing of a headlamp is essentially comprised of a housing 1 of the headlamp, which at two lower fixing points 2, 2' and one upper fixing point 3 is attached to a support part 4 of a motor vehicle.

The support part 4, for example, can be designed as a cross member of a front-end module, which, together with an integrated cooling unit, a headlamp housing as well as a shock absorber, can be mounted to a body part of the motor vehicle. This requires that a readjustment of the headlamp housing 1 in relation to the groove course of the body contour adjacent to the headlamp housing 1, which can be a hood, for example, is possible. Alternatively, the support part 4 can also be a body part of the motor vehicle, wherein the adjustment device of the present invention allows the adjustment of the headlamp housing in a body opening of the motor vehicle by adhering to a specified groove course.

On each of the lower fixing points 2, 2', the housing 1 of the headlamp is provided with a connecting piece 5, 5' protruding transversely to the radiation direction of the headlamp, each connecting piece being slidable arranged via a disk-shaped and quadrangular-shaped holder 6 along a first adjustment direction Y to a receptacle 7 of the support part 4. For this purpose, the holder 6 is slidably positioned at the receptacle 7 via a track 8 serving as a guide.

The connecting piece 5, 5' is detachably connected to the holder 6 by a screw connection including a bolt 9, 9' provided with a washer. After mounting the housing 1 to the support part 4 by attaching the connecting pieces 5, 5' arranged in the lower region of the housing 1 to the holder 6 and a connecting piece 10 arranged in the upper region of housing 1 (upper fixing point 3) to the support part 4 by screw connection, an adjustment of housing 1 along the first adjustment direction Y can be made. For this purpose, the holder 6 is positioned, tolerance-free, both along a second adjustment direction Z extending vertically to the first adjustment direction Y, and along a third adjustment direction X, both of which extend vertically to the first adjustment direction Y, via track 8.

In order to move the holder 6 together with the housing 1, it is necessary to unlock a blocking device 11, which relative to the holder 6, is stationarily arranged with a fixing element 12 and a fixing plate 13 below holder 6. The fixing element 12 is a screw, which impacts a fixing plate 13 that extends parallel to the holder 6 so that in a locking position of the blocking device 11, when the fixing element 12 is tightened, the rim sections of an upper edge region 14 of the fixing plate 13 press firmly against the holder 6 and fixes it into place with respect to the receptacle 7. When the blocking device 11 is in the unlocked position, the fixing element 12 is loosely arranged so that no pressure is exerted on the holder 6 by the fixing plate 13. It is now possible to move the holder 6 continuously to the desired adjustment position, which is fixed in place by locking the blocking device 11.

For the adjustment of the housing 1 in the second adjustment direction Z, the connecting piece 5, 5' is an elongated-hole part, the elongated hole 15 of which extends in the second adjustment direction Z. The holder 6 is provided with guide edges 16 as guiding means, which extend around its periphery along the second adjustment direction Z so that the elongated-hole part 5, 5' is slidable in the second adjustment direction relative to the holder 6. The length of the elongated hole 15 determines the adjustment path along the second adjustment direction Z.

The bolt 9, which can be fixed to the holder 6 via the elongated-hole part 15, extends parallel to the fixing screw 12 of the blocking device 11. Bolt 9 of the lower fixing points 2, 2', which independently from one another are equally adjustable both in the first adjustment direction Y and the second adjustment direction Z, extend vertically to a screw 17, with which the upper connecting piece 10 of the upper fixing point 3 is mounted to the support part 4. The upper connecting piece 10 has a longitudinal hole extending in the third adjustment direction X so that an adjustment of housing 1 in the third adjustment direction X is possible. By fixing screw 17 into place, the adjustment of housing 1 in the third adjustment direction X is fixed.

Preferably, the holder 6 is an injection-molded plastic part. Preferably, the holder 6 can be provided with an inserted metal reinforcement.

Preferably, the holder 6 has a bore with an internal screw thread for receiving bolt 9. Alternatively, the fastening of the connecting piece 5, 5' can also be realized by a bolt 9, which is put through an unthreaded bore of holder 6 and is anchored by a nut at the rear.

As an alternative, bolt 9 can also be a self-tapping threaded screw, which engages with a plastic bore of holder 6.

The holders 6 assigned to the lower fixing points 2, 2' allow the adjustment along the first adjustment direction Y. Alternatively, track 8 of the receptacle 7 can also extend along the second adjustment direction Z or the third adjustment direction X. Thus, an adjustment on the lower fixing points 2, 2' in a Y-X or Z-X plane is possible.

According to an alternative embodiment, the connecting pieces 5, 5' can be flexible so that a tilting of housing 1, thus forming an acute angle to the adjustment directions Y, Z, X, is made possible.

The invention claimed is:

1. A device which provides for independent and multiple adjustments for fixing a headlamp in multiple directions comprising:
   a housing in a body opening of a motor vehicle having at least one lower fixing point, which, in a vertical direction, is arranged in a lower region of the housing, and having at least one upper fixing point, which, in a vertical direction, is arranged in an upper region of the housing,
   a connecting piece of the housing connected to a support part at the upper or lower fixing point via a slidable holder, which extends transversely to a radiation direction of the headlamp and along a first adjustment direction (Y),
   wherein, in the first adjustment direction (Y), the slidable holder is slidably positioned relative to the support part via a guide, and the slidable holder has a designated blocking device for fixing the slidable holder in the first adjustment direction (Y),
   wherein the blocking device comprises a fixing element connected to the support part and a fixing plate, wherein the fixing plate fixes the slidable holder into place when the fixing element is activated and wherein the fixing element is arranged in a parallel offset to a screw connection of an elongated hole part,
   wherein the slidable holder is a plastic part having a quadrangular shape and is provided with guiding means such that the connecting piece of the housing is slidably positioned relative to the slidable holder to define a second adjustment direction (Z) extending vertically to the first adjustment direction (Y), and
   wherein the connecting piece includes a plurality of connecting pieces connected to support parts at both the upper and lower fixing points, wherein the connecting piece at the upper fixing point contains a longitudinal hole which extends in a third adjustment direction (X), and means are provided for adjustably fixing the connecting piece to said support part in said third adjustment direction (X).

2. The device according to claim 1, wherein the connecting piece contains an elongated-hole part which extends vertically to the first adjustment direction (Y) providing said second adjustment direction (Z).

3. The device according to claim 2, wherein the elongated hole part is connected to the slidable holder by a screw connection.

4. The device according to claim 1, wherein the blocking device is formed such that in the first adjustment direction (Y), the slidable holder is continuously slidable and fixable.

5. The device according to claim 1, wherein the guiding means for the slidable holder includes a guide edge extending in the second adjustment direction (Z), which extends along at least one rim side of the slidable holder.

6. The device according to claim 1, wherein the fixing element of the blocking device is a fixing bolt.

7. The device of claim 1, wherein the connecting piece is flexible to facilitate tilting of the housing in the adjustment directions.

8. A device which provides for independent and multiple adjustments for a headlamp in an (X), (Y) and (Z) direction in a body opening of a motor vehicle which comprises:
   a headlamp and a supporting structure which houses the headlamp;
   at least one fixing point disposed at a lower region of the headlamp and at least one fixing point disposed at an upper region of the headlamp;
   the fixing point at the lower region of the headlamp comprising a connecting piece extending from the headlamp and connected to a slidable holder which, in turn, is slidably received by elements of the supporting structure providing adjustment in a first adjustment direction (Y), wherein the slidable holder is a plastic part having a quadrangular shape;
   a blocking device operatively associated with the slidable holder for locking and unlocking the operation of the slidable holder and means for unlocking the blocking device to enable the slidable holder to move to a desired second adjustment direction (Z);
   the fixing point disposed in the upper region of the headlamp comprises a connecting piece extending from the headlamp and connected to the supporting structure, said connecting piece containing a longitudinal hole which extends in a third adjustment direction (X), and means for adjustably fixing the connecting piece to said supporting structure in said third adjustment direction (X); and wherein the blocking device comprises a fixing element connected to the support part and a fixing plate, wherein the fixing plate fixes the slidable holder into place when the fixing element is activated and wherein the fixing element is arranged in a parallel offset to a screw connection of an elongated hole part.

* * * * *